(12) United States Patent
Ebrahimian et al.

(10) Patent No.: US 7,078,452 B2
(45) Date of Patent: *Jul. 18, 2006

(54) LOW SMOKE EMISSION, LOW CORROSIVITY, LOW TOXICITY, LOW HEAT RELEASE, FLAME RETARDANT, ZERO HALOGEN POLYMERIC COMPOSITIONS

(75) Inventors: Shahzad Ebrahimian, Rindge, NH (US); Mark A. Jozokos, Pelham, NH (US)

(73) Assignee: AlphaGary Corporation, Leominster, MA (US)

( * ) Notice: Subject to any disclaimer, the term of this patent is extended or adjusted under 35 U.S.C. 154(b) by 592 days.

This patent is subject to a terminal disclaimer.

(21) Appl. No.: 10/315,757

(22) Filed: Dec. 10, 2002

(65) Prior Publication Data

US 2003/0125439 A1   Jul. 3, 2003

Related U.S. Application Data

(63) Continuation of application No. 09/667,353, filed on Sep. 22, 2000, now Pat. No. 6,492,453.

(60) Provisional application No. 60/155,849, filed on Sep. 24, 1999.

(51) Int. Cl.
*C08K 3/34* (2006.01)

(52) U.S. Cl. .............. 524/444; 524/447; 524/517; 524/522

(58) Field of Classification Search ........... 524/444, 524/447, 517, 522
See application file for complete search history.

(56) References Cited

U.S. PATENT DOCUMENTS

| | | | |
|---|---|---|---|
| 3,064,073 A | 11/1962 | Downing et al. | 174/110 |
| 3,529,340 A | 9/1970 | Polizzano et al. | 29/202.5 |
| 3,567,846 A | 3/1971 | Brorein | 174/102 |
| 3,930,984 A | 1/1976 | Pitchford | 208/10 |
| 4,104,481 A | 8/1978 | Wilkenloh et al. | 174/28 |
| 4,107,354 A | 8/1978 | Wilkenloh et al. | 427/118 |
| 4,204,086 A | 5/1980 | Suzuki | 174/102 |
| 4,255,318 A | 3/1981 | Kaide et al. | 260/42.18 |
| 4,274,997 A | 6/1981 | Schneider et al. | 260/45.75 |
| 4,284,842 A | 8/1981 | Arroyo et al. | 174/107 |
| 4,319,940 A | 3/1982 | Arroyo et al. | 156/56 |
| 4,352,701 A | 10/1982 | Shimba et al. | 156/51 |
| 4,412,094 A | 10/1983 | Dougherty et al. | 174/110 |
| 4,468,089 A | 8/1984 | Brorein | 350/96.23 |
| 4,468,435 A | 8/1984 | Shimba et al. | 428/383 |
| 4,562,302 A | 12/1985 | Checkland et al. | 174/118 |
| 4,789,589 A | 12/1988 | Baxter | 428/317.5 |
| 4,892,683 A | 1/1990 | Naseem | 252/609 |
| 4,963,609 A | 10/1990 | Anderson et al. | 524/413 |
| 4,983,326 A | 1/1991 | Vandersall | 252/603 |
| 5,036,121 A | 7/1991 | Coaker et al. | 524/100 |
| 5,059,651 A | 10/1991 | Ueno | 524/424 |
| 5,104,735 A | 4/1992 | Cioffi et al. | 428/383 |
| 5,158,999 A | 10/1992 | Swales et al. | 524/100 |
| 5,164,258 A | 11/1992 | Shida et al. | 428/319.3 |
| 5,173,960 A | 12/1992 | Dickinson | 385/100 |
| 5,358,786 A | 10/1994 | Ishikawa et al. | 428/380 |
| 5,670,748 A | 9/1997 | Gingue et al. | 174/120 |
| 5,717,000 A | 2/1998 | Karande et al. | 521/83 |
| 5,773,502 A | 6/1998 | Takekoshi et al. | 524/411 |
| 5,840,796 A | 11/1998 | Badesha et al. | 524/449 |
| 5,932,641 A | 8/1999 | Blanchard et al. | 524/112 |

FOREIGN PATENT DOCUMENTS

| | | |
|---|---|---|
| DE | 34 09 369 | 9/1985 |
| EP | 0352699 | 1/1990 |
| EP | 0 709 429 | 1/1996 |
| FR | 2 156 229 | 5/1973 |
| FR | 2 220 549 | 10/1974 |
| GB | 1114179 | 5/1968 |
| GB | 2125207 | 2/1984 |
| JP | 47-9499 | 3/1972 |
| JP | 56-004642 | 1/1981 |
| JP | 2000-080213 | 3/2000 |
| WO | WO 93/24938 | 12/1993 |

*Primary Examiner*—Bernard Lipman
(74) *Attorney, Agent, or Firm*—McAndrews, Held & Malloy, Ltd.

(57) ABSTRACT

Zero halogen polyolefin compositions exhibit low smoke emission, low corrosivity, low toxicity, and low heat release properties, as well as flame resistance and char formation, while simultaneously maintaining favorable electrical insulation properties. Such compositions are especially useful for coating wires and conductors employed in high-speed speed telecommunication data transmission cables.

25 Claims, No Drawings

_(1)_

LOW SMOKE EMISSION, LOW CORROSIVITY, LOW TOXICITY, LOW HEAT RELEASE, FLAME RETARDANT, ZERO HALOGEN POLYMERIC COMPOSITIONS

CROSS-REFERENCE TO RELATED APPLICATION(S)

The present application is a continuation of U.S. Pat. application Ser. No. 09/667,353 filed Sep. 22, 2000, now U.S. Pat. No. 6,492,453 issued Dec. 10, 2002, which in turn relates to and claims priority benefits from U.S. Provisional Pat. application Ser. No. 60/155,849 filed Sep. 24, 1999, entitled "Low Smoke, Low Corrosivity, Low Toxicity, Low Heat Release, Flame Retardant, Zero Halogen Polymeric Compositions". Each of the '353 and '849 applications is hereby incorporated by reference herein in its entirety.

FIELD OF THE INVENTION

The present invention relates to zero halogen thermoplastic elastomer compositions based on olefinic polymers. The compositions have low smoke, corrosivity, toxicity, and heat release properties, as well as favorable flame resistance and char integrity with non-dripping characteristics, while maintaining favorable electrical insulation properties.

The preferred composition may be employed as electrical insulation, insulation skin, jacket (sheath), buffer, cross web (spline), shield, and/or separator materials in the manufacture of optical fibers or electrical wires and cables.

BACKGROUND OF THE INVENTION

A broad range of electrical conductors and electrical cables are installed in modern buildings for a wide variety of uses. Some of these uses are data transmission for computer systems, voice communications, as well as control signal transmission for building security, fire alarm, and environmental control systems. Some of these cables networks are frequently installed in the through-space between the dropped ceiling and floor above, currently referred to as the Plenum area. Electrical conductors and cables extending through plenum areas are governed by special provisions of the National Electric Code ("NEC").

The National Fire Protection Association ("NFPA") recognized the potential flame and smoke hazards created by burning cables in Plenum areas and adopted in the NEC a standard for flame retardant and smoke suppressed cables. This standard permits the use of cable without conduit, so long as the cable exhibits low smoke and flame retardant characteristics.

The test method used for such distinctions is the Steiner Tunnel flame test. This method has been adopted as NFPA 262 and Underwriters Laboratory (UL) 910. The test conditions for are as follows: a 300,000 BTU/hour flame is applied for 20 minutes to a tray of cable, which is 1 foot wide by 24 feet long, mounted horizontal within the Steiner Tunnel. The criteria for passing the flame test is a maximum flame spread of five feet, a maximum optical density of smoke less than or equal to 0.50, and an average optical density of smoke of less or equal to than 0.15.

The most commonly used telecommunication cable has four unshielded twisted pairs of insulated conductors (4 UTP). A majority of these cables use fluorinated ethylene/propylene polymers (FEP) as the insulation material of choice with a low smoke polyvinyl chloride jacket. The advantages of FEP are excellent electrical properties with a high degree of flame retardancy. However, FEP has many disadvantages as well. FEP is very expensive and drips off of the cable when exposed to a flame. This hot molten polymer also will release a very aggressive acid gas in hydrofluoric acid (HF). This gas is extremely toxic to humans when they are even exposed to small amounts.

An insulation material or combination of materials that could pass all the electrical and smoke requirements of NFPA 262, while not dripping off the cable when exposed to a flame, be low toxic and low corrosivity, and come at a lower cost would be useful in this application. This need has been established by industry trends of replacing some of the FEP with an alternate cheaper material. Until this time there has not been an insulation composition that was able to fully replace the FEP insulation in the telecommunications cable.

The present invention details polymeric compositions that can fully or partially replace FEP insulation while not dripping off the cable when exposed to a flame, with toxicity and corrosivity and comes at a much lower cost.

SUMMARY OF THE INVENTION

The present improved zero halogen polymeric compositions comprise:
  (a) a base polymer selected from the group consisting of at least one polyolefin polymer;
  (b) a filler comprising at least one substance selected from the group consisting of metal hydrates, oxides, carbonates, talcs, clays, molybdates, borates, stannates, graphite, carbon black, silicates and phosphates;
  (c) an additive comprising at least one substance selected from the group consisting of an antioxidant, an organosilane, a pigments and a lubricant;
  (d) an unsaturated dicarboxylic anhydride; and
  (e) a nanoclay filler.

In preferred improved zero halogen polymeric compositions, the at least one polyolefin polymer is selected from the group consisting of polyethylene (PE) (including very low density polyethylene (VLDPE), low density polyethylene (LDPE), high density polyethylene (HDPE)), polypropylene (PP), ethylene-propylene copolymer (sometimes referred to as ethylene-propylene rubber (EPR)), ethylene-vinyl acetate (EVA), ethylene-ethyl acrylate (EEA), ethylene-methyl acrylate (EMA), copolymers containing ethylene monomeric units and terpolymers containing ethylene monomeric units. The at least one polyolefin polymer may be crosslinked or grafted by any convenient method, such as chemical crosslinking using organic peroxide or chemical grafting using acrylic and maleic acids.

In preferred improved zero halogen polymeric compositions, the unsaturated dicarboxylic anhydride is selected from the group consisting of a maleic anhydride, an itaconic anhydride, an aconitic anhydrides, a citraconic anhydride, and unsaturated dicarboxylic anhydrides modified thermoplastic polymers, where at least some of the anhydride functional groups are replaced by a functional group selected from the group consisting of carboxyl and carboxylate functional groups.

In preferred improved zero halogen polymeric compositions, the nanoclay filler is selected from the group consisting of synthetic silicate montmorillonites, natural layered silicate montmorillonites (the main fraction of the clay mineral bentonite) and a layered alumna-silicate.

In the preferred nanoclay filler, the individual platelets are approximately 1 micron in diameter, giving them an aspect ratio of about 1000:1. It is this morphology that leads to increased barrier properties with respect to moisture, resistance of the composition to deformation, resistant of the composition to whitening and/or blooming, improved mechanical strength (tensile modulus and flexural modulus), sizeable drop in heat release rate and smoke emission properties, and improved flame retardancy of the polymeric compositions. The nanoclay fillers are preferably chemically modified to increase the hydrophobicity of their surfaces.

Improved insulated wires comprise a wire and at least one polymeric composition, as defined above, surrounding the wire. Improved insulated conductors comprise a plurality of bunched, twisted, and/or bundled insulated wires, as defined above.

DETAILED DESCRIPTION OF PREFERRED EMBODIMENT(S)

Although the present improved zero-halogen polymeric compositions will be described herein in reference to insulated wires of telecommunication cables, it is not so limited. The present improved polymeric compositions can be employed in applications in which flame resistance, char formation, low smoke emission, low corrosivity, low toxicity, and low heat release properties, while simultaneously maintaining favorable electrical insulation properties, are desired.

The polyolefin blends employable in the present compositions are selected from the group consisting of VLDPE, LDPE, LLDPE, HDPE, PP, EPR, EVA, EEA, EMA, EBA, copolymers containing ethylene monomeric units and terpolymers containing ethylene monomeric units. The preferred polyolefin blend is selected from the group consisting of VLDPE and HDPE. The polyolefin blend is preferably employed at a level of 100 parts by weight.

The filler in the present compositions contains one or more from the group consisting of metal hydrates, oxides, carbonates, talcs, clays, molybdates, borates, stannates, carbon black, silicates, and phosphates. The preferred compositions contain approximately 200 parts per hundred by weight of filler in relation to the weight of the base polymer.

The additive package contains, but is not limited to, antioxidants, organosilanes, pigments, and lubricants. The preferred compositions also contain antioxidant stabilizers and lubricants. In the preferred compositions, the additive package is approximately 5 parts by weight in relation to the weight of the base polymer.

The compositions contain unsaturated dicarboxylic anhydrides such as maleic, itaconic, aconitic or citraconic anhydride or unsaturated dicarboxylic anhydrides modified thermoplastic polymers, where the anhydrides may be replaced in whole or in part by carboxyl or carboxylate functionality. The preferred compositions contain maleic anhydride modified polyolefins at a level of 5 parts by weight in relation to the weight of the base polymer.

The present compositions contain suitable nanoclay fillers, which are synthetic and/or natural layered silicate montmorillonites (the main fraction of the clay mineral bentonite), a layered alumna-silicate whose individual platelets measure on the order of one-micron diameter, giving them an aspect ratio of about 1000:1. The nanoclay fillers are preferably chemically modified to increase the hydrophobicity of their surfaces, thereby enhancing the effectiveness of the nanoclay fillers' fire performance. Table 1 sets forth the working formulation ranges for the present compositions.

TABLE 1

| Composition | Parts by Weight |
|---|---|
| Olefinic Polymer Blend System | 85–100 |
| Filler System | 0.01–300 |
| Additive Package | 0.01–15 |
| Functionalized Polyolefin | 0.01–10 |
| Nanoclay (Surface modified) | 0.01–10 |
| Typical Properties | |
| Durometer Shore D | 30–70 |
| Tensile Strength (psi) | 1500–2500 |
| Elongation (%) | 100–500 |
| Oxygen Index (%) | 20–50 |
| Dielectric Constant (1 MHZ) | 2.25–3.20 |
| Dissipation Factor (1 MHZ) | 0.001–0.0001 |
| Cone Calorimetry (50 Kw/m$^2$, Heat Flux) | |
| Peak Heat Release Rate (kW/m2) | 75–90 |
| Ave. Heat Release Rate (kW/m2) | 70–85 |
| Peak Spec. Ext. Area (m$^2$/kg) | 100–250 |
| Ave. Spec. Ext. Area (m$^2$/kg) | 40–120 |

Experimental Details

The present compositions are further elaborated by preparing laboratory batches and investigating their physical, electrical, and combustion properties. Some of the batches were also formed into telecommunication cable and evaluated according to the NFPA 262 horizontal burn test (Steiner Tunnel Test).

The formulation examples in Table 2 were compounded using a Buss MDK 46-15D Kneader. Table 2 also includes the corresponding physical, electrical, and combustion properties of the compositions prepared.

TABLE 2

| | 1 phr | 2 phr | 3 phr | 4 phr | 5 phr | 6 phr | 7 phr |
|---|---|---|---|---|---|---|---|
| Ingredients | | | | | | | |
| HDPE | | | | 57.8 | 57.8 | 57.8 | 57.8 |
| VLDPE - 1 | 42.6 | 42.6 | 42.6 | | | | |
| VLDPE - 2 | | | | 35.5 | 35.5 | 35.5 | 35.5 |
| VLDPE - 3 | 42.6 | 42.6 | 42.6 | | | | |
| PP - Copolymer | 14.8 | | | | | | |
| PP - Homopolymer | | 7.9 | 7.9 | 6.6 | 6.6 | 6.6 | 6.6 |
| MA - PP | | 3.4 | 3.4 | 2.8 | 2.8 | 2.8 | 2.8 |
| Montmorillonite | | 3.4 | 3.4 | 2.8 | 2.8 | 2.8 | 2.8 |

TABLE 2-continued

|  | 1 phr | 2 phr | 3 phr | 4 phr | 5 phr | 6 phr | 7 phr |
|---|---|---|---|---|---|---|---|
| Magnesium Hydroxide | 178.7 | 178.7 | 120.0 | 78.5 | 146.7 | 177.7 | 222.1 |
| Ethylene bis-tetrabromo-phthalimide |  |  | 48.7 |  |  |  |  |
| Amtmony trioxide |  |  | 10.0 |  |  |  |  |
| Zinc Borate | 4.8 | 4.8 | 4.8 | 6.6 | 6.6 | 6.6 | 6.6 |
| Zinc Stannate | 4.8 | 4.8 | 4.8 | 0.2 | 0.2 |  |  |
| Silicone Fluid | 4.8 | 4.8 | 4.8 | 6.6 | 6.6 | 6.6 | 6.6 |
| Antioxidants | 2.2 | 2.2 | 2.2 | 2.2 | 2.2 | 2.2 | 2.2 |
| Organosilanes (vinyl or epoxy types) | 1.2 | 1.2 | 1.2 |  |  | 1.3 | 1.3 |
| Total | 296.5 | 296.4 | 296.4 | 199.6 | 267.8 | 299.9 | 344.3 |
| Properties |  |  |  |  |  |  |  |
| S.G. | 1.460 | 1.445 | 1.505 | 1.27 | 1.43 | 1.450 | 1.540 |
| "D" Durometer | 56/47 | 58/49 | 58/50 | 1.2 | 62/53 | 62/53 | 63/52 |
| O.I. (0.125") | 35.0 | 36.0 | 42.0 | 30.0 | 33.0 | 36.0 | 38.0 |
| Smoke (%) | 4.6 | 6.2 | 11.5 | 5.3 | 4.5 | 5.4 | 4.9 |
| Smoke Color | White | Light | Dark | White | Light | Light | Light |
| Tensile (psi) - Tape(20"/min.) | 1355 | 1390 | 1364 | 1696.0 | 1711 | 1763 | 1238 |
| % Elongation -Tape (20"/min.) | 526 | 77 | 234 | 571.0 | 81 | 13 | 2 |
| MFR (230° C., 2.16 kg) | 1.06 | 0.302 | — | — | 0.6 | 0.2 | 0.1 |
| DC (1 MHz) | 3.18 | 3.01 | 3.01 | 2.7 | 3.00 | 3.16 | 3.34 |
| DF (1 MHz) | 0.0004 | 0.0003 | 0.0003 | 0.0001 | 0.0006 | 0.0007 | 0.0009 |
| DC (100 MHz) | 3.1800 | 3.2400 | — | 2.80 | 2.9600 | 3.1300 | 3.3300 |
| DF (100 MHz) | 0.0004 | 0.0008 | — | 0.0004 | 0.0006 | 0.0009 | 0.0014 |
| Cone Calorimetry (50 kW/m$^2$) |  |  |  |  |  |  |  |
| Time to ignition (s) | 90.0 | 100.0 | 100.0 |  |  |  |  |
| Total Heat Evolved (kJ) | 371.5 | 395.0 | 369.2 |  |  |  |  |
| Mass Loss (g) | 16.6 | 15.5 | 20.5 |  |  |  |  |
| Peak Heat Release Rate (kW/m$^2$) | 83.2 | 89.3 | 86.9 |  |  |  |  |
| Ave. Heat Release Rate (kW/m$^2$) | 73.6 | 79.0 | 73.8 |  |  |  |  |
| Peak Eff. Heat of Combustion (MJ/kg) | 24.4 | 27.5 | 20.0 |  |  |  |  |
| Ave. Eff. Heat of Combustion (MJ/kg) | 22.5 | 25.3 | 17.9 |  |  |  |  |
| Peak Spec. Ext. Area (m$^2$/kg) | 214.3 | 105.1 | 921.7 |  |  |  |  |
| Ave. Spec. Ext. Area (m$^2$/kg) | 124.7 | 41.7 | 654.4 |  |  |  |  |

The Steiner Tunnel Test has been adapted for the burning of cables resultant from the selective laboratory batches. These cables were burned according to NFPA 262, Underwriters Laboratories (UL-910), or Canadian Standards Association (CSA FT-6). The test conditions are as follows: a 300,000 BTU/hour flame is applied for 20 minutes to ten 24-foot lengths of test cables mounted on a horizontal tray within a tunnel.

The criteria for passing the Steiner Tunnel Test are as follows:
(A) Flame spread—flame travel less than 5.0 feet.
(B) Smoke generation—Maximum optical density of smoke less than 0.5 and average optical density of smoke less than 0.15.

TABLE 3

| | Cable | | | Smoke | | Flame | |
|---|---|---|---|---|---|---|---|
| Test # | Type | Jacket | Insulation | Peak | Average | Spread (ft) | Status |
| 1 | 4 UTP | LSPVC | Batch 2 | 0.38 | 0.10 | 1.5 | Pass |
| 2 | 4 UTP | PVDF | Batch 2 | 0.24 | 0.06 | 4.0 | Pass |
| 3 | 4 UTP | PVDF | Batch 3 | 0.62 | 0.26 | 2.0 | Fail |
| 4 | 4 UTP | PVDF | HDPE | 0.90 | 0.17 | 13.0 | Fail |
| 5 | 4 UTP | LSPVC | HDPE Foam/ Batch 4 Skin | 0.39 | 0.12 | 3.0 | Pass |

The NFPA 262 burn results are summarized in Table 3. Further examination of this data will validate the invention. Test 1 and test 2 show passing results with both a low smoke PVC jacket and a PVDF jacket. The present compositions therefore meet the criteria of NFPA 262.

Test 3 shows a failing result due to high peak and average smoke numbers. Test 3 utilized batch 3 for the insulation, which is a halogenated flame retardant olefin. From this test it can be concluded that the halogenated flame retardant olefin will not meet the requirements for the NFPA 262.

Test 4 shows failing results for all criteria. The cable had high peak and average smoke, as well as a high flame spread. From this test it can be concluded that a non flame retardant olefin will not meet the requirements of NFPA 262.

The insulation in test five is different than the previous insulations discussed. The insulation in test 5 was dual layer insulation. The under layer was a non-flame retardant high-density polyethylene foam, with the top layer being a solid Batch 4 skin. The skin has two functions, acts as a protective flame barrier, and meets the electrical requirements of the cable. As shown in the results summarized in Table 3, the present compositions (Batch 4) employed in skin applications yielded passing results according to the criteria of NFPA 262.

An important factor that contributes to efficacy of the present compositions is the use of nanoclay fillers in the zero halogen polymeric compositions. Proper employment of nanoclay fillers in the polymeric composition reduced heat release and smoke properties. When properly employed in the present compositions, the nanoclay filler induces char formation that results in the insulation not dripping off the cable under a flame condition. The combination of reduced smoke emission, char formation, non-dripping insulation, and passing results in the NFPA 262 flame test make the present compositions esspecially suitable for use in the telecommunication market.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A zero halogen polymeric composition comprising: (a) a base polymer selected from the group consisting of at least one polyolefin polymer; (b) a filler comprising at least one substance selected from the group consisting of metal hydrates, oxides, carbonates, talcs, clays, molybdates, borates, stannates, graphite, carbon black, silicates and phosphates; (c) an additive comprising at least one substance selected from the group consisting of an antioxidant, an organosilane, a pigments and a lubricant; (d) an unsaturated dicarboxylic anhydride; and (e) a nanoclay filler.

2. The composition of claim 1 wherein the at least one polyolefin polymer is selected from the group consisting of polyethylene, polypropylene, ethylene-propylene copolymer, ethylene-vinyl acetate, ethylene-ethyl acrylate, ethylene-methyl acrylate, copolymers containing ethylene monomeric units and terpolymers containing ethylene monomeric units.

3. The composition of claim 1 wherein said at least one polyolefin polymer is crosslinked.

4. The composition of claim 3 wherein said at least one polyolefin polymer is crosslinked using an organic peroxide.

5. The composition of claim 1 wherein said at least one polyolefin polymer is grafted at least one of an acrylic acid and a maleic acid.

6. The composition of claim 1 wherein said unsaturated dicarboxylic anhydride is selected from the group consisting of a maleic anhydride, an itaconic anhydride, an aconitic anhydrides, a citraconic anhydride, and unsaturated dicarboxylic anhydrides modified thermoplastic polymers, where at least some of the anhydride functional groups are replaced by a functional group selected from the group consisting of carboxyl and carboxylate functional groups.

7. The composition of claim 6 wherein said unsaturated dicarboxylic anhydride is maleic anhydride present in an amount of approximately 5 parts by weight in relation to the weight of said base polymer.

8. The composition of claim 1 wherein said nanoclay filler is selected from the group consisting of synthetic silicate montmorillonites, natural layered silicate montmorillonites and a layered alumna-silicate.

9. The composition of claim 8 wherein the individual platelets of said nanoclay filler are approximately 1 micron in diameter.

10. The composition of claim 8 wherein said nanoclay filler is chemically modified to increase its hydrophobicity.

11. The composition of claim 1 wherein the said at least one polyolefin polymer is a blend of low density polyethylene and high density polyethylene.

12. The composition of claim 1 wherein said filler comprises at least one substance selected from the group consisting of metal hydrates, oxides, carbonates, talcs, clays, molybdates, borates, stannates, carbon black, silicates, and phosphates.

13. The composition of claim 12 wherein said filler is present in an amount of approximately 200 parts per hundred by weight in relation to the weight of said base polymer.

14. The composition of claim 1 wherein said additive comprises at least one substance selected from the group consisting of an antioxidant, an organosilane, a pigment, and a lubricant.

15. The composition of claim 14 further comprising an antioxidant stabilizer.

16. The composition of claim 14 wherein said additive is present in an amount of approximately 5 parts by weight in relation to the weight of said base polymer.

17. An insulated wire comprising a wire and the polymeric composition of claim 1, said composition surrounding said wire.

18. An insulated conductor comprising a plurality of the insulated wires of claim 17.

19. The insulated conductor of claim 18 wherein said plurality of insulated wires are bunched.

20. The insulated conductor of claim 18 wherein said plurality of insulated wires are twisted.

21. The insulated conductor of claim 18 wherein said plurality of insulated wires are bundled.

22. The insulated conductor of claim 18 wherein said wire is a copper conductor.

23. The insulated conductor of claim 18 wherein said wire is an optical fiber.

24. The composition of claim 1 wherein said composition is foamed.

25. A jacketed electrical cable comprising the insulated conductor of claim 18 and a jacketing material, said jacketing material comprising a zero halogen polymeric composition comprising: (a) a base polymer selected from the group consisting of at least one polyolefin polymer; (b) a filler comprising at least one substance selected from the group consisting of metal hydrates, oxides, carbonates, talcs, clays, molybdates, borates, stannates, graphite, carbon black, silicates and phosphates; (c) an additive comprising at least one substance selected from the group consisting of an antioxidant, an organosilane, a pigments and a lubricant; (d) an unsaturated dicarboxylic anhydride; and (e) a nanoclay filler, said jacketing material surrounding said insulated conductor.

* * * * *